United States Patent [19]

Wu et al.

[11] Patent Number: 4,471,357
[45] Date of Patent: Sep. 11, 1984

[54] PIPELINED DIGITAL SAR AZIMUTH CORRELATOR USING HYBRID FFT/TRANSVERSAL FILTER

[75] Inventors: Chialin Wu, Pasadena; Kuang Y. Liu, Los Angeles, both of Calif.

[73] Assignee: The United States of America as represented by the Administrator of the National Aeronautics and Space Administration, Washington, D.C.

[21] Appl. No.: 314,928

[22] Filed: Oct. 26, 1981

[51] Int. Cl.³ .............................................. G01S 9/00
[52] U.S. Cl. ............................. 343/5 CM; 343/5 FT; 343/5 DP
[58] Field of Search ............ 343/5 CM, 5 DP, 5 FT, 343/9 PS, 5 CF; 364/728, 726, 724

[56] References Cited

U.S. PATENT DOCUMENTS

| | | | |
|---|---|---|---|
| 4,003,054 | 1/1977 | Goldstone | 343/5 FT X |
| 4,034,370 | 7/1977 | Mims | 343/5 DP X |
| 4,045,795 | 8/1977 | Fletcher et al. | 343/5 DP X |
| 4,132,989 | 1/1979 | Arens | 364/728 X |
| 4,292,634 | 9/1981 | Wu et al. | 343/5 CM |
| 4,298,950 | 11/1981 | Smith, Jr. | 364/726 |
| 4,355,311 | 10/1982 | Jam | 343/9 PS X |

OTHER PUBLICATIONS

Lawrence R. Rabiner & Bernard Gold, Theory and Application of Digital Signal Processing Prentice Hall 1975 Chapter 6 pp. 356-437.

*Primary Examiner*—Maynard R. Wilbur
*Assistant Examiner*—Brian Steinberger
*Attorney, Agent, or Firm*—Paul F. McCaul; Thomas H. Jones; John R. Manning

[57] ABSTRACT

A synthetic aperture radar system (SAR) having a range correlator (10) is provided with a hybrid azimuth correlator (12) for correlation utilizing a block-pipelined Fast Fourier Transform (12a) having a predetermined FFT transform size with delay elements (Z) for so delaying SAR range correlated data as to embed in the Fourier transform operation a corner-turning function as the range correlated SAR data is converted from the time domain to a frequency domain. A transversal filter (12b) connected to receive the SAR data in the frequency domain, and from a generator (14b) a range migration compensation function, D, to a programmable shift register (30) for accurate range migration compensation; weights, $W_i$, to multipliers (35-38) for interpolation, and an azimuth reference function, $\phi_j$, in the frequency domain to a multiplier 42 for correlation of the SAR data. Following the transversal filter is a block-pipelined inverse FFT (12c) used to restore azimuth correlated data in the frequency domain to the time domain for imaging. The FFT transform size is selected to accommodate the different SAR azimuth aperture lengths, number of looks and prefiltering requirements.

14 Claims, 11 Drawing Figures

PIPELINED DIGITAL SAR AZIMUTH CORRELATOR USING HYBRID FFT/TRANSVERSAL FILTER

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

This invention relates to digital signal processing for synthetic aperture radar (SAR), and more particularly to pipelined digital signal processing for producing real-time high-resolution SAR images using a hybrid processor comprised of a fast Fourier transform (FFT) for correlation in the SAR azimuth (along-track) direction and a time-domain transversal filter to accommodate the dispersion of the SAR response in the range direction. This dispersion is caused by the variation of target distance to the SAR transmitter-receiver over the SAR aperture length, and is often referred to as the range migration effect that must somehow be compensated in the SAR data processing.

The utility of synthetic aperture radar, under investigation for approximately three decades, has been found to be a useful instrument for a number of geological and oceanographical applications. The launch of a spaceborne SAR on the SEASAT satellite in June, 1978, marked the advance of SAR remote sensing technology from a conventional airborne environment into an earth orbiting spaceborne environment.

Two important aspects of SAR systems are the high data acquisition rate and the complicated data reduction process. Real-time data reduction to form images for the airborne SAR system was accomplished in the mid 1970's. Real-time spaceborne SAR processing for producing high quality images is still a continuing challenge. Much of the operational SEASAT SAR image formation process is currently being handled by an optical processor and a moderate throughput software-based digital SAR processing system. In order to meet the objectives of potential candidates of future operationally oriented spaceborne SAR missions in which the image data will be used in a prompt fashion to derive surface state of temporal change data, a real-time or near real-time SAR processing capability is required.

Techniques for achieving this real-time processing to form SAR images involve a number of engineering disciplines. A survey of the state-of-the-art SAR processing indicates the following conclusions: (1) the theoretical framework for SAR sensor operation and data processing is reasonably well understood; (2) many techniques for SAR data reduction for forming images have been devised, but their performance characteristics and design tradeoffs have not been fully established; and (3) the major cost factor of a high quality real-time SAR processor is the need for a tremendous number of high speed electronic devices and associated interconnective networks.

Existing candidate architectures for a real-time SAR processor include the time-domain transversal filter and the frequency-domain multistage Fast Fourier Transform (FFT). A comparison of these two types of approaches yields differences in the arithmetic computation and processing control requirements.

In digital processing of SAR data, the raw data that has been quadrature demodulated and digitized is first range compressed. This range compression is required only if the radar employs a coded waveform in its transmitted pulses. The output of this range correlation process is sequential in the range dimension. Therefore, before starting a two-dimensional azimuth correlation, one needs to perform the so-called corner-turning or matrix transpose on the range correlated data. This is a quite time-consuming process. If two-dimensional azimuth correlation is done entirely in the time domain, then fine interpolation between data at discrete locations must be performed to trace the maximum amplitude response. Also the azimuth dimension is usually quite large, so a large time-domain transversal filter is required to perform the azimuth correlation. All of these considerations make the time-domain approach undesirable.

But the alternative to perform a two-dimensional azimuth correlation entirely in the frequency domain is also undesirable. For severe range migration, this alternative requires a large amount of hardware to do the two-dimensional transform. Furthermore, this alternative requires the transform of the two-dimensional reference function. Hence changing the reference function is not easy.

What is required is a digital synthetic aperture radar (SAR) azimuth correlator which produces real-time, high-resolution SAR imagery utilizing the frequency domain for range and azimuth correlation without requiring excessively large memory capacity for the SAR data being processed, and a corner-turn technique that will alleviate the complicated matrix transpose problem in a two-dimensional azimuth correlation following the range correlation with spectral filtering performed in the azimuth dimension, and a range transversal filtering in the time domain to conveniently accommodate the range migration effect. These features yield on efficient and modular SAR processor with which an exact SAR correlation algorithm may be implemented.

SUMMARY OF THE INVENTION

In accordance with the present invention, an SAR azimuth correlator uses a combination of frequency domain and time domain processing for the two-dimensional azimuth correlation. The azimuth correlator is comprised of a block-pipelined FFT, a transversal filter, an azimuth reference multiplier, a block-pipelined inverse FFT and a generator for range migration compensation and azimuth reference functions used in the transversal filter. The range correlated data, received by the block-pipelined FFT sequentially line by line, is delayed properly in each stage of a block-pipelined FFT. Thus corner-turning operation is embedded in the FFT processor. Target response interpolations and range migration corrections in the range dimension are performed in an interpolation filter. This interpolation filter is followed by an azimuth reference multiplier. Since the interpolation weights are fixed and the azimuth reference function only change gradually with range, the control part of the time-domain processing is very simple. In case of severe range migration, namely dispersion of the SAR response in the range direction caused by the variation of target distance to the SAR transmitter-receiver over the SAR aperture length, often referred to as the range migration effect, the interpolation weights and azimuth reference will be combined to perform the true hybrid azimuth correlation algorithm (frequency domain in azimuth dimension and time domain in the transversal filter for the range migration compensation). The output of the reference multiplier is fed into the block-pipelined inverse FFT. The magnitude of the inverse FFT output is then generated (squared) for imaging. Thus SAR images are formed sequentially line-by-line in a continuous manner at the output of the SAR processor. The magnitude of single-look images will also be used to provide clutterlock and autofocusing adjustments for the azimuth portion of the control processor.

The novel features that are considered characteristic of this invention are set forth with particularity in the appended claims. The invention will best be understood from the following description when read in connection with the accompanying drawings.

DESCRIPTION OF PREFERRED EMBODIMENTS

Figure 1:
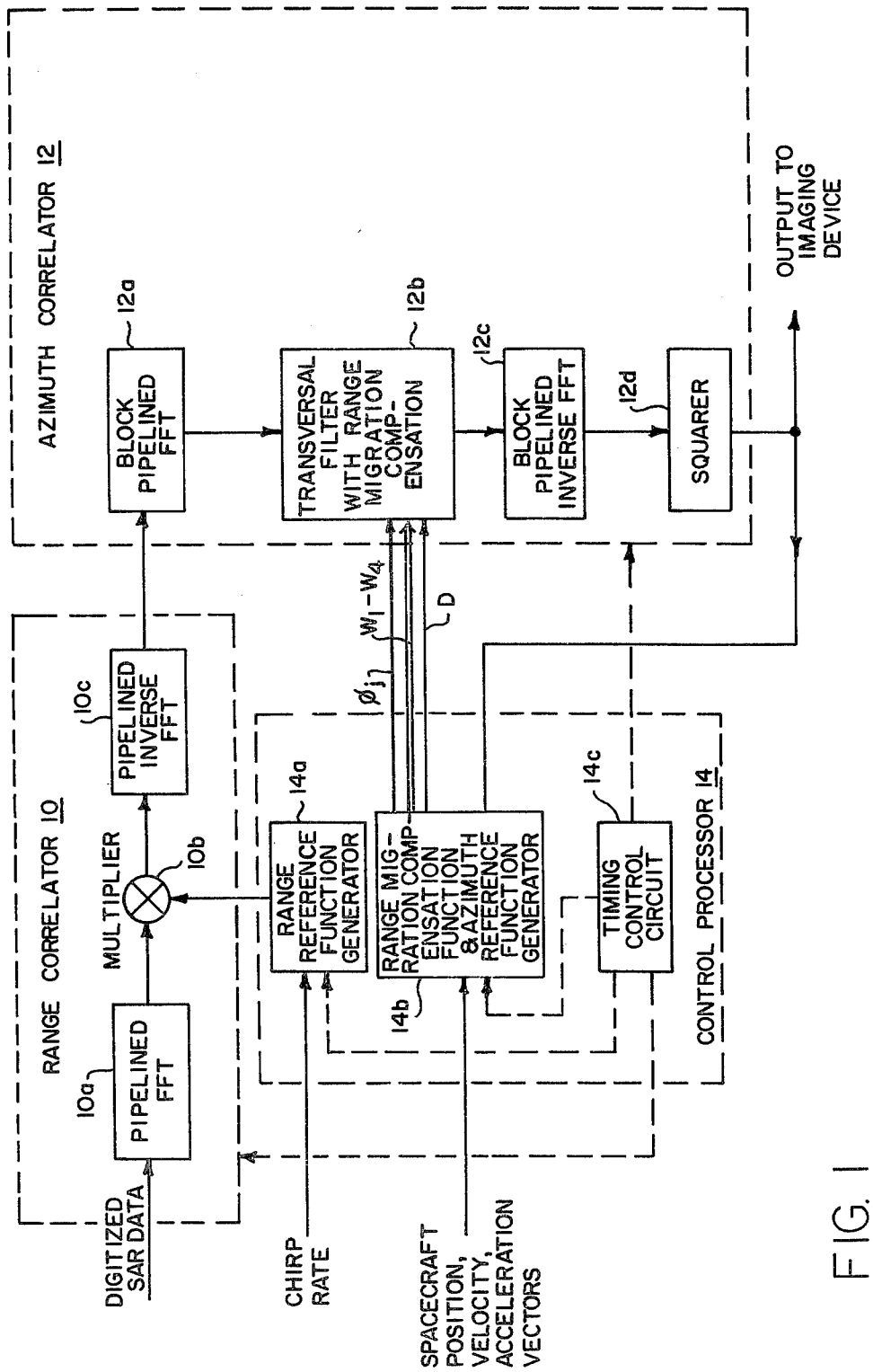
FIG. 1 is a system block diagram of a hybrid (time-domain and frequency-domain) SAR processor according to the present invention.

The SAR signal processing system disclosed in FIG. 1 is based on a hybrid SAR azimuth correlation algorithm developed recently to handle SEASAT SAR type of signal processing problems which are characterized by a large correlation compression ratio and a severe range curvature. It is comprised of a range correlator 10 and an azimuth correlator 12, together with a programmed digital control processor 14 which provides in the usual manner functions indicated by the functional blocks 14a, b and c labeled RANGE REFERENCE FUNCTION GENERATOR, RANGE MIGRATION COMPENSATION FUNCTION AND AZIMUTH REFERENCE FUNCTION GENERATOR and TIMING CONTROL CIRCUIT. The range correlator, which compresses the transmitted pulse waveform into a narrow pulse, provides fast frequency-domain correlation in the range dimension using a pipelined Fast Fourier Transform (FFT) 10a, a digital multiplier 10b and a pipelined inverse Fast Fourier Transform (FFT) 10c. The azimuth correlator performs the synthetic aperture processing with a combination of fast frequency-domain correlation in the azimuth dimension and a time-domain convolution in the range dimension to accommodate the two-dimensional range curvature effect. The control processor provides the range and azimuth reference functions and timing control to the rest of the SAR processor.

The significance of the design is a block-pipelined Fast Fourier Transform (FFT) 12a in the azimuth correlator which incorporates both the transform processing and the memory corner-turn (matrix-transpose) operations. Subsequently, a transversal filter 12b provides range migration compensation in the azimuth spectral domain. A block-pipelined inverse Fast Fourier Transform (FFT) 12c restores the SAR data to the time domain for imaging through a squarer 12d, and optionally a multiple-look processing circuit as disclosed in U.S. Pat. No. 4,292,634 granted to the Administrator of the National Aeronautics and Space Administration before this application was filed by the Administration. Spacecraft data carrying the system, namely position, velocity and acceleration vectors, are inputs to the control processor which utilizes the predetermined range pulse waveform for generating the range reference function and the spacecraft data (position, velocity and acceleration vectors) for generating the range migration compensation and the azimuth reference functions. Interpolation weights generated by the azimuth portion of a control processor are set inputs to multipliers of the transversal filter in a conventional manner as will be described more fully hereinafter. The detected single look range data are also fed into the azimuth portion of the control processor to provide a closed-loop clutterlock and autofocusing adjustment.

Before proceeding with a more detailed description of the invention shown in FIG. 1, a brief review of the hybrid correlation algorithm will first be given. The major emphasis of this disclosure will then be to focus on the new SAR correlation architecture.

Review of the Hybrid Correlation Algorithm

In a typical SAR operation, phase encoded pulses are transmitted from the radar antenna in a direction perpendicular to the radar flight path, and echo signals are received in time-sequenced bursts. It is conventional to represent the received echo signals in a two-dimensional form with time delay within an echo burst period as the vertical axis of the presentation and along-track elapsed time as the other axis. After designating the two spatial variables r and x for the cross-track (range) and along-track (azimuth) distances to the radar sensor, it may be shown that the echo response s(x,r) of an extended target which has a radar cross section $\sigma(x,r)$ can be written as:

$$s(x,r) = \sigma(x,r) \otimes h(x,r) \tag{1}$$

where $\otimes$ stands for a two-dimensional convolution, and h(x,r) is the impulse response of the SAR and is expressed as:

$$h(x,r) = h_1(x,r) \otimes h_2(x,r) \tag{2}$$

The $h_1$ and $h_2$ functions are the azimuth and range responses, respectively. Equations 1 and 2 show that a reconstruction of the target reflectivity $\sigma(x,r)$ can be performed by a correlation of the SAR echo data $s(x,r)$ with range response $h_2(x,r)$ and subsequently with a modified azimuth response, which is a convolution of the $h_1$ function and the compressed range waveform. Filtering for range response $h_2(x,r)$ is a standard pulse compression process in radar system and can be performed by several different types of pulse compression schemes. The emphasis of SAR processing is upon azimuth correlation to compress the dispersed azimuth waveform into a narrow one.

If linear FM (frequency modulation) phase encoding is used in the transmitted waveform, then range compression will produce a "sine x over x" sin x/x type of radar response in the range dimension. Correlation of this range sin x/x response and the azimuth response $h_1(x,r)$ is given by the following equation:

$$h_1(x, r) = W_a(x) \exp\left[-j \frac{4\pi r_1(x)}{\lambda}\right] \delta(r - r_1(x)) \quad (3)$$

where
$\lambda$ = radar wavelength
$W_a(x)$ = SAR antenna response in azimuth
$r_1(x)$ = range delay function between sensor and target
$\delta(x)$ = Dirac's Delta function
results in a waveform:

$$h_3(x, r, r_o) = \sum_{i=1}^{n} g_i(x, r_o) \delta(r - d_i) \quad (4)$$

where $$g_i(x, r_o) = W_a(x) \frac{\sin C_o(d_i - r_1(x, r_o))}{C_o(d_i - r_1(x, r_o))} \exp j\psi(x, r_o) \quad (5)$$

$$\psi(x, r_o) = -\frac{4\pi r_1(x, r_o)}{\lambda} \quad (6)$$

$C_o$ is a factor depending on the range resolution, and $d_i$ is the range of the i-th range bin. Note that a parameter, $r_o$, which denotes the target slant range at the center of the SAR antenna illumination, is used to reflect the range dependent nature of the range delay function $r_i(x)$ in Equation 3. Also note that in Equation 4, the range-correlated azimuth response function is expressed as a summation of azimuth response along slant range bins. The extent of the summation indicates the amount of range migration which traverses through n range sample elements. Each $g_i(x,r_o)$ is a one-dimensional waveform.

The $g_i$ functions for different i have overlapped amplitude response due to the sin x/x function. However, a continuous phase function given by $\psi(x,r_o)$ is provided.

The reconstructed reflectivity $\sigma(x,r_o)$ is obtained from:

$$\hat{\sigma}(x,r_o) = \int\int s(\alpha+x, \beta+r_o) h_3^*(\alpha,\beta,r_o) d\alpha d\beta \quad (7)$$

where $s(x,r_o)$ is the range-correlated SAR echo, and "*" means complex conjugate. Substituting Equation 4 into Equation 7, and performing Fourier transforms on the resulting equation with respect to x yields:

$$\hat{\Omega}(u, r_o) = \sum_{i=1}^{n} S(u, d_i + r_o) G_i^*(u, r_o) \quad (8)$$

where $\Omega(u,r_o)$, $S(u,d_i+r_o)$, and $G_i^*(u,r_o)$ represents the Fourier transforms of $\sigma(x,r_o)$, $s(x,d_i+r_o)$, and $g_i^*(\sigma,r_o)$, respectively. Equation 8 implies that a filtered image line for targets at range distance $r_o$ is a linear superposition of several filtered azimuth line spectra at range distance from $r_o+d_1$ to $r_o+d_n$. This filtering approach is indeed a combination of frequency-domain processing in azimuth and a time-domain convolution which involves reference multiplication and coherent summation in the range dimension. Also, note that this correlation approach as defined in Equation 8 is exact for a target response which is assumed to be invariant in the azimuth dimension. The filter function $G_i^*$ can be updated periodically along the range dimension to accommodate the range dependent nature of the Doppler frequency rate. The approach described in Equation 8 is referred to as the hybrid correlation algorithm for SAR processing.

This hybrid approach is applicable for any general two-dimensional correlation problem, where the correlation reference is invariant over the two-dimensional data block. For SAR processing with small to moderate range curvature or migration effect, the dispersion of SAR response is small. This hybrid approach has advantages over two-dimensional FFT fast correlation in two ways: (1) reference function can be continuously updated as processing proceeds in range swath direction; and (2) a short convolutional filter in range dimension may have a higher computational efficiency than the FFT fast correlation implementation. A special processor which is based on this hybrid algorithm and lends itself to a pipelined operation will now be described.

Figure 2:
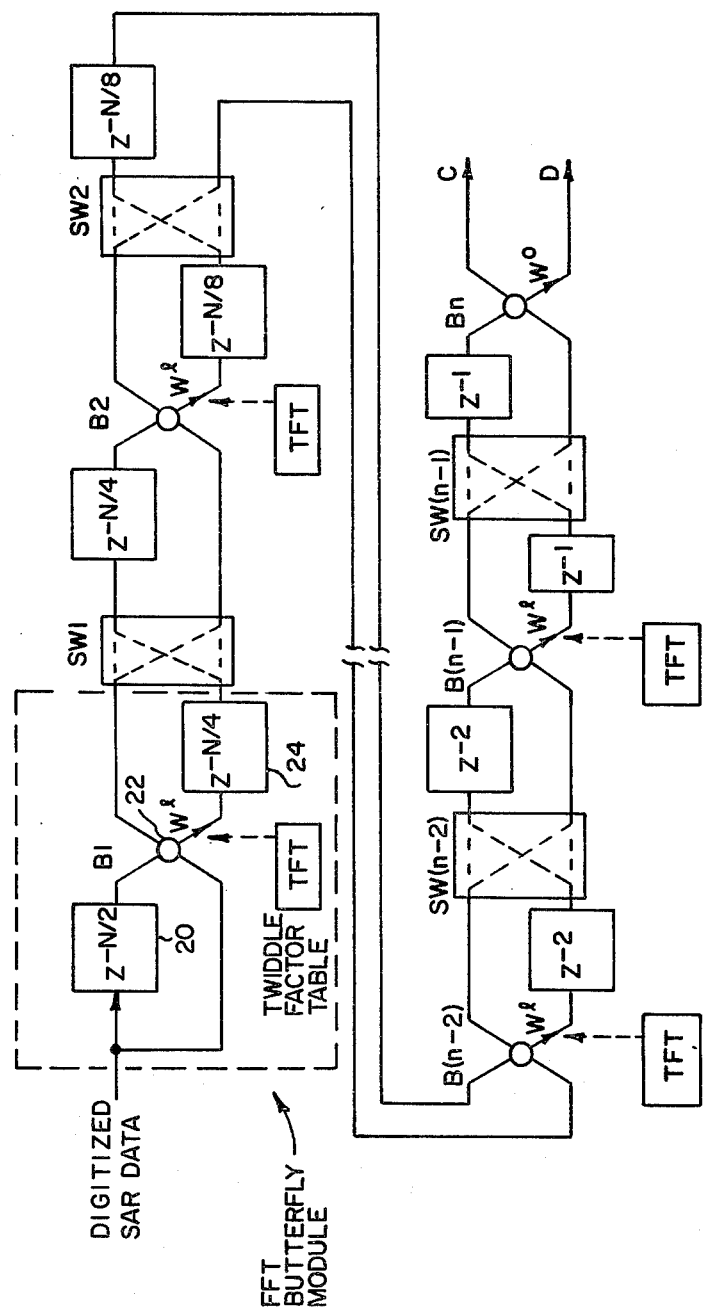
FIG. 2 is a block diagram of a pipelined FFT for range correlation.
Figure 3:
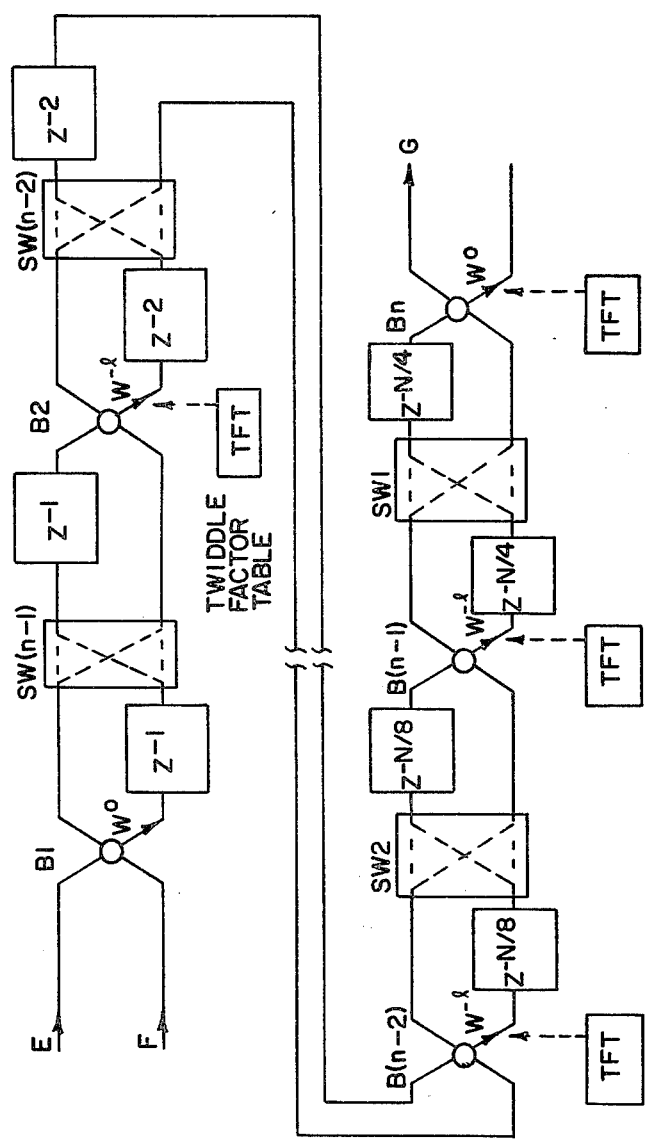
FIG. 3 is a block diagram of a pipelined inverse FFT for range correlation.

Review of One-Dimensional Pipelined FFT and Its Application to SAR Range Correlation The range correlator 10 is a straightforward match filter comprised of a pipelined FFT processor 10a shown in FIG. 2 followed by a pair of range reference function multipliers 10b, one for each of two outputs C and D of the FFT, and a pipelined inverse FFT processor 10c shown in FIG. 3 which receives inputs E and F from the multiplier 10b. The range reference function is the complex conjugate of the transmitted baseband signal.

Referring now to FIG. 2, an N-point decimation-in-frequency (DIF) pipelined FFT is shown for range correlation, where N equals $2^n$ and n is an integer. There are n FFT butterfly modules consisting of a delay element 20 at one of two inputs of a butterfly logic structure 22, and a delay element 24 connected to the one of two outputs of the butterfly logic structure, to which a "twiddle factor" is applied from a table TFT in a read-only memory. This twiddle factor is a weighting value $W^l$ which may be precomputed and stored for the FFT process in a conventional manner. The delay elements may be shift registers implemented with first-in-first-out (FIFO) memories of N/2 stages for the delay element 20, and N/4 stages for the delay element 24. The notation $Z^{-N/2}$ and $Z^{-N/4}$ thus means a delay of N/2 and a delay of N/4 for the two delay elements 20 and 24, respectively. Other FFT butterfly modules are similarly implemented with the pair of delay elements having half the stages of the corresponding pair of the preceding module, except the last which has only one delay element of one stage.

For correlating long sequences, the overlap-save correlation scheme is used. This scheme requires that the input of the pipelined FFT processor 10a (a digitized and quadrature demodulated SAR echo) be delayed before entering one input of the first butterfly unit 22 and that the same input data be fed directly into another input of the butterfly unit 22. The data is then processed through n stages for N data points. Since the overlap-and-save scheme produces N/2 bad data points, only one output on the pipelined inverse FFT 10c shown in FIG. 3 is used as the input to the azimuth correlator. The data are preferably complex logarithmic numbers to reduce the size of the delay elements and butterfly logic structure.

To implement this overlap-save correlation scheme each module is connected to the next by a switch that alternately connects one module to the next directly and then crosses the connections, with suitable delays in one input and one crossed output of each module. There are therefore n switches (SW) for n FFT butterfly modules. The timing for the first four of these switches shown in FIG. 4 can easily be generated by a sampling clock counter having stages 1 through n numbered from the most significant stage having a value $2^n$ to the least significant stage having a value $2^l$. The outputs of the stages thus alternate the switches at different time intervals, with SW2 operating at twice the rate of SW1, SW3 at twice the rate of SW2, and so forth, so that as the first module stores N/2 points and then switches, the next stores N/4 points and then switches, and so forth.

Figure 4:
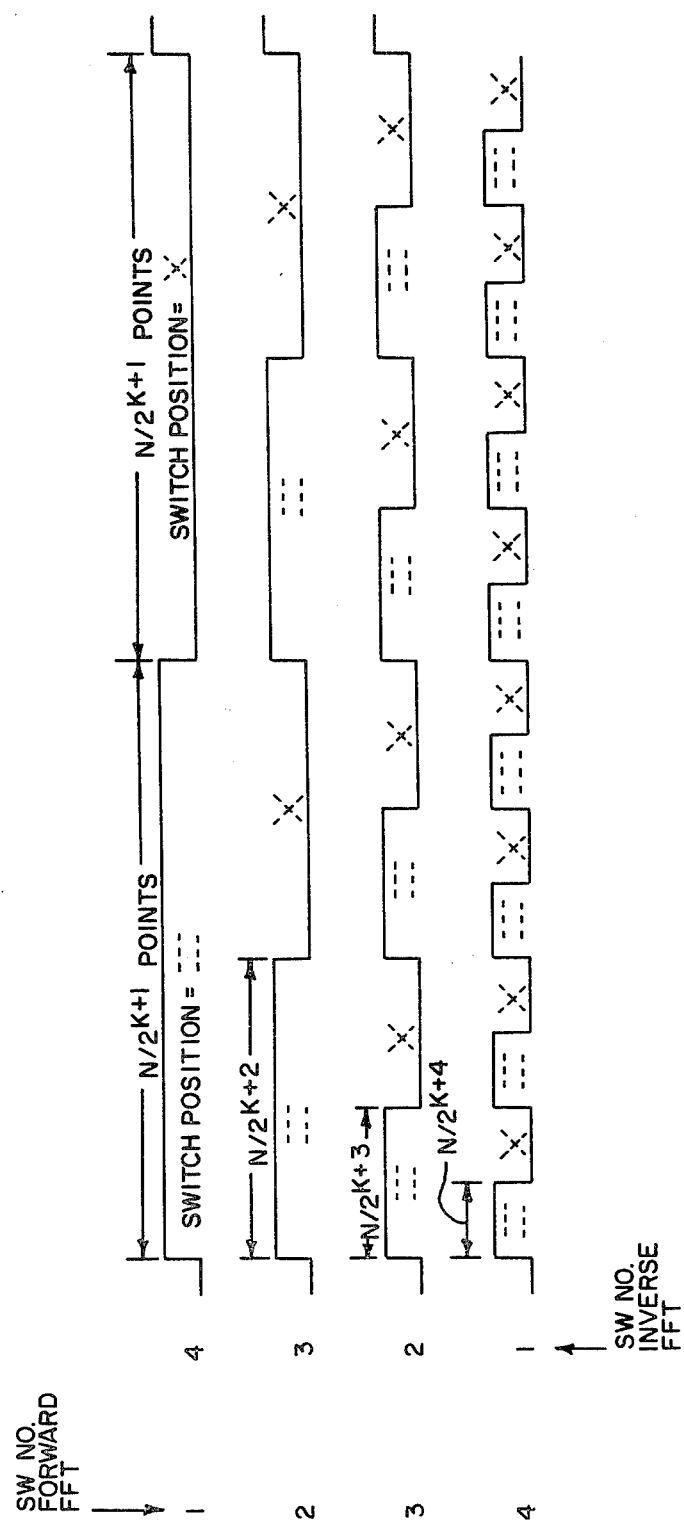
FIG. 4 is a switch timing diagram for the pipelined FFT of FIG. 2, and the inverse pipelined FFT shown in FIG. 3.

The pipelined inverse FFT processor 10c shown in FIG. 3 is organized in much the same way, but reversed, with two inputs E, F and one output G. Note that the delay elements of delay times $Z^{-1}$ through $Z^{-N/4}$ are in an order inversed from that of the forward FFT processor shown in FIG. 2, and that for timing the switches are numbered inversely from n-1 through 1. Consequently the timing waveforms shown in FIG. 4 are applied to the switches in the inverse order, as indicated by the notation in FIG. 4, with the switch nearest the input having the shortest switching period and the switch next to the output having the longest switching cycle. Also note that the first butterfly module has no input delay element, and that as the delay elements get progressively shorter in the pipelined FFT processor 10a, they get progressively longer in the inverse pipelined FFT module 10c.

Although, for convenience, only four stages (butterfly modules) are shown for the pipelined FFT processor, it should be understood that the number of stages is in fact n for an N-point decimation-in-frequency (DIF) pipelined FFT and inverse FFT. For a further discussion on the organization and operation of such a forward and inverse FFT, reference is made to *Theory and Application of Digital Signal Processing* by Lawrence R. Rabiner and Bernard Gold, published by Prentice Hall, Inc. (1975), and in particular chapter 6 titled "Spectrum Analysis and the Fast Fourier Transform" and chapter 10 titled "Special-Purpose Hardware for the FFT" wherein, among other things, the authors introduce and use the now accepted term "twiddle factors." FIGS. 2 and 3 for the forward and inverse pipelined FFT are functional block diagrams using the symbols employed by the authors. What is unique in the present application of a pipelined FFT is that the input signal is applied to both inputs of the first butterfly module, to one input through a delay $Z^{-N/2}$, and to the other input directly.

Azimuth Correlator Architecture Using Block Pipelined FFT

A key element of the invention is the block-pipelined FFT processor 12a which accepts sequential radar echo samples and performs a Fourier transform in the azimuth dimension. The output of the block FFT processor consists of sequential data points corresponding to a column of Fourier coefficients in an azimuth transformed two-dimensional data block.

The data handling procedure is described in the following formulation. Let $\{s_{i,j}\}$ be a two-dimensional (range and azimuth) block of SAR echo data consisting of N range bins ($d_1$ points) and M echo lines ($d_2$ points). The corresponding azimuth transformed data are denoted by $\{S_{i,j}\}$. The sequence of sampled range echo data input to the block FFT processor is according to $\{\ldots s_{i,j}s_{i+1,j}\ldots s_{N,j}s_{1,j+1},\ldots\}$ for N samples per echo line (column) of data. The output data points of the block-pipelined FFT processor are also in a sequence of increasing i. Let $\{G^*_{i,j}\}$ be the filter coefficients and $\{\hat{\Omega}_{i,j}\}$ the filtered spectra. For each column of FFT output $\{S_{i,j}\}$, the hybrid correlation algorithm calculates $\{\hat{\Omega}_{i,j}\}$ of Equation 8 according to:

$$\hat{\Omega}_{i,j} = \sum_{k=1}^{n} S_{i+k-1,j} \cdot G^*_{k,j} \qquad (9)$$

Equation 9 above indicates a n-point convolver which operates on the Fourier coefficients inside each column sequence and then outputs a filtered spectra $\{\hat{\Omega}_{i,j}\}$.

This time-domain convolution accomplishes the correlation function for SAR response that is dispersed in range dimension. A block-pipelined inverse FFT processor 12c inputs the filtered spectra $\{\hat{\Omega}_{i,j}\}$ and outputs SAR correlated echo signals $\{\hat{\Omega}_{i,j}\}$ in range sample sequence.

As noted hereinbefore, the range correlated data is fed into the azimuth correlator sequentially, line-by-line along the range dimension, and it should be recalled that the hybrid azimuth correlation algorithm requires performing a Fourier transform on the results of range correlation along the azimuth direction. Therefore a corner-turn operation is needed to line up data points along the azimuth direction.

Figure 6:
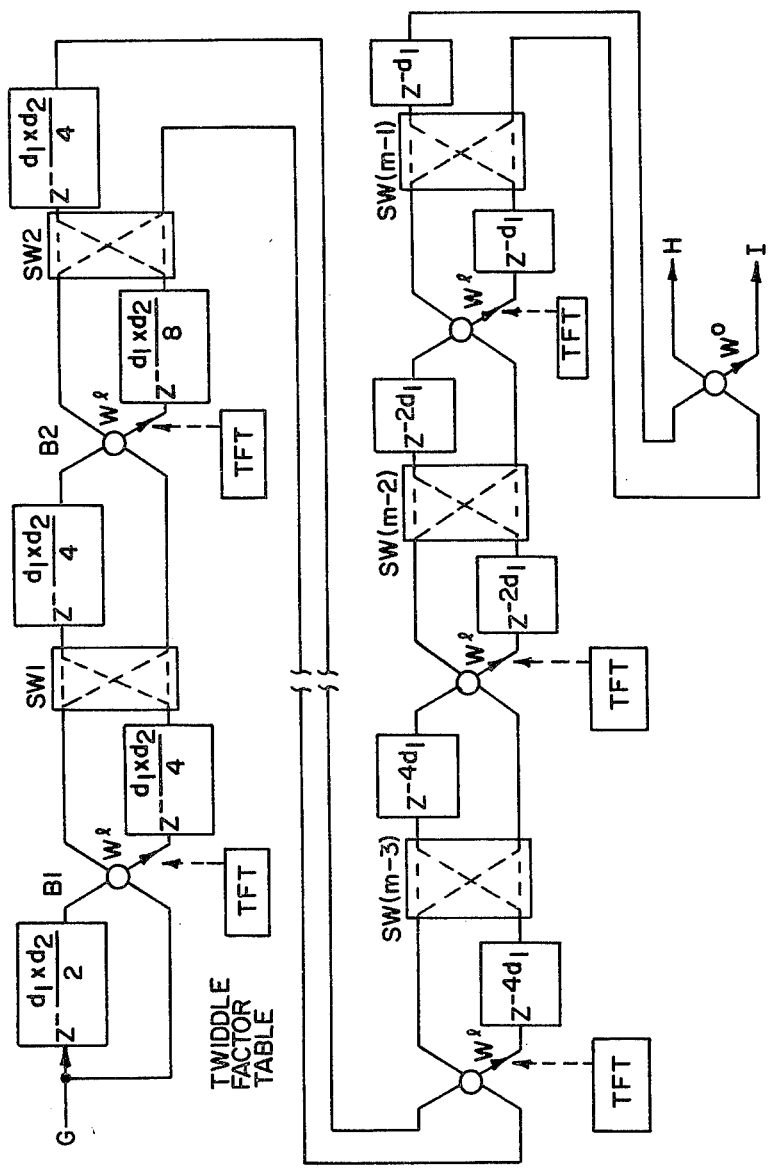
FIG. 6 is a functional block diagram of a block-pipelined FFT for the azimuth correlator of FIG. 1.

A novel technique is to implement the corner-turn operations among the FFT stages. To illustrate this technique, consider the $d_1 \times d_2$ data block shown in FIG. 9, where $d_1$ and $d_2$ are the number of data samples along the range direction and the azimuth direction, respectively. A $d_2$ point block-pipelined decimation-in-frequency (DIF) FFT 12a for a $d_1 \times d_2$ data block is shown in FIG. 6. For correlating these long sequences, the overlap-save correlation scheme is used. As in the pipelined FFT for correlation in the range dimension, this scheme requires that the input data be delayed before entering one input of the first butterfly unit and the same input data is fed directly into the other input of the first butterfly unit. Thus the input data are overlapped by half a block.

Figure 10:
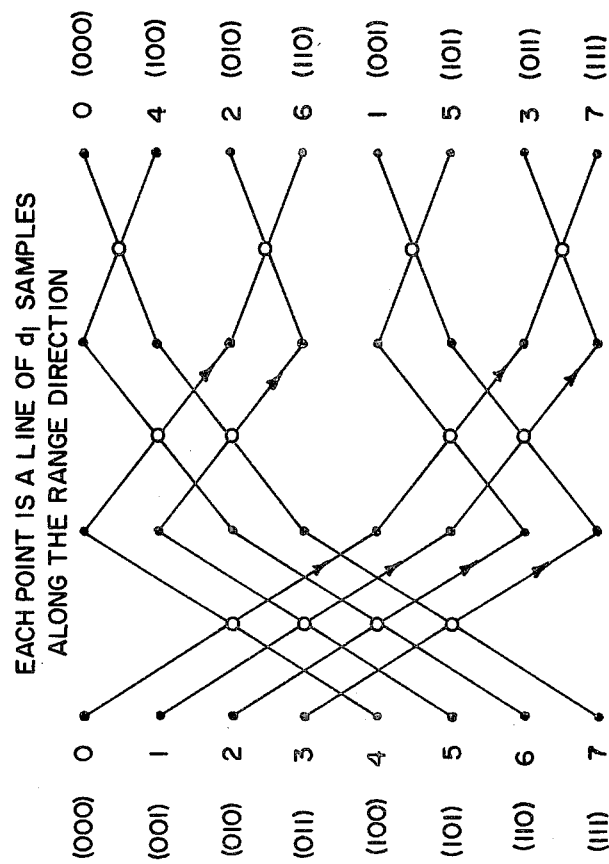
FIG. 10 is a flow diagram of an 8-point block-pipelined FFT or an $d_1 33$ 8 data block for corner turning.

Note that the delay on the first FFT stage is equal to half the data block long. This is because in the first stage of the FFT, the two data points which should be operated on along the azimuth direction are separated by half a block. In the second stage of the FFT, the input is delayed by ¼ block, i.e., delay time $Z^{-d_1d_2/4}$, to line up the data points. The rest of the FFT stages are operated similarly. The flow diagram of an 8-point block-pipelined FFT for a $d_1 \times 8$ data block is shown in FIG. 10. Note that each point in FIG. 10 represents a line of $d_1$ samples along the range direction, and not a data point in an 8-point DIF pipelined FFT. This is important to the present invention for it is here that the corner-turn operation takes place in the azimuth correlator.

Figure 5:
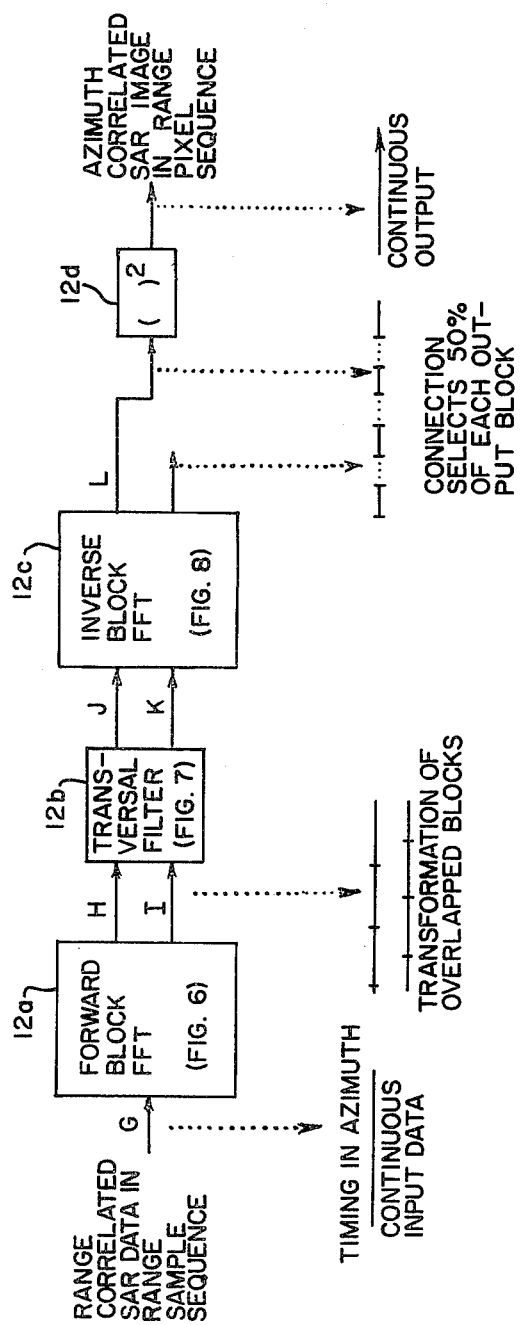
FIG. 5 is a timing diagram for the hybrid azimuth correlator of FIG. 1.
Figure 7:
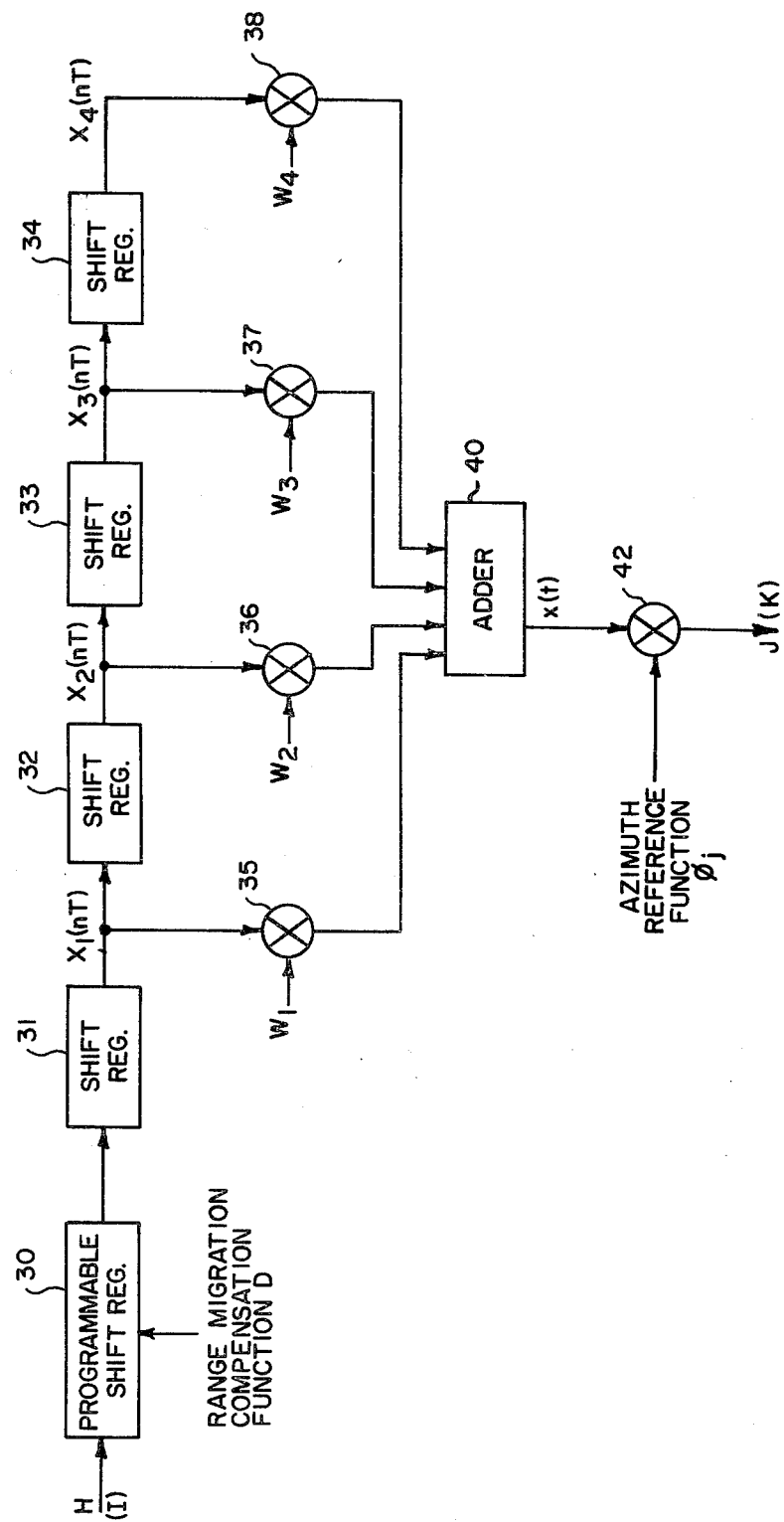
FIG. 7 is a functional block diagram of an exemplary transversal filter used to implement the range migration compensation and range interpolations and azimuth reference multiplication function in the system of FIG. 1.

The procedure thus outlined is shown with a timing diagram in FIG. 5. Note that range correlated SAR data in range sample sequence is provided as continuous input data to the forward block-pipelined FFT where transformation of overlapped blocks takes place. A pair of n-point convolution filters, each comprised of a transversal filter which applies range interpolation weights to the data, as shown in FIG. 7, and an azimuth reference multiplier, also as shown in FIG. 7, the inverse block-pipelined FFT receives the outputs of these convolution filters and processes it still in overlapped blocks. From the inverse FFT, only one output is used, namely the output L shown in FIG. 8. As a consequence, only alternate ones of the two overlapped blocks of data are used, as though a switch, SW shown in FIG. 5, is alternated between output terminals of the inverse FFT. These blocks are merged into a continuous stream which, upon squaring, provides azimuth correlated SAR image data in proper range pixel sequence.

The design of the block-pipelined FFT processor 12a is analogous to a conventional one-dimensional pipelined FFT processor as shown in FIGS. 2 and 3. Note that the block-pipelined FFT processor 12a for the azimuth correlator performs transformation only along the azimuth dimension. By substituting each point storage or delay in the conventional one-dimensional FFT processor with a shift-register storage of one line (or column) of data which consists of N sampled data points, the transform manipulation is performed on data separated by N-1 points in the input sequence. These points correspond to a row of data along the azimuth dimension in a two-dimensional presentation of SAR data shown in FIG. 9. The output of the block-pipelined FFT processor now represents a column of spectral coefficients denoted by $\{S_{i,j}\}$. The idea of extending one point to one line shift delay in the block-pipelined FFT processing is analogous to the extension of a one-dimensional discrete convolver into a convolver with tapped registers for a time-domain SAR azimuth correlator.

It should be noted that the Fourier coefficients after the transformation in the azimuth dimension are output in range column sequence, i.e., $\{\ldots S_{i,j}, S_{i+1,j}, \ldots\}$. Hence, the filter multiplication as expressed by Equation 9 can be performed by the transversal filter 12b implemented with a n-point one-dimensional transversal filter. The phases of $G_{k,j}$ are approximately constant for a given j which refers to a constant azimuth position for most of the SAR operation of the transversal filter 12b in nominal situations. A simplification is to separate $G_{k,j}$ into the amplitude weights (W), phase ($\phi_j$) and a coarse delay for range migration compensation introduced through a programmable shift register as shown in FIG. 7, which illustrates the organization of the transversal filter 12b of FIG. 1. The reference coefficient $\{G^*_{i,j}\}$ can be gradually updated in range by the control processor to accommodate the range dependent nature of the target response. The coefficients are changed for every column of spectral coefficients.

The inverse transform of the spectrally filtered data is performed by the block-pipelined inverse FFT processor 12c, which is essentially another block FFT processor having its architecture inverse to that of the forward block-pipelined FFT processor 12a. With bit-reversed sequence of the transformed coefficients as input, the sequence of the inversely transformed output will be back to the original echo line order in time-domain.

Using the FFT fast-correlation approach as incorporated in the hybrid algorithm per each block of transformation, the number of valid output points equals the difference between the sizes of the transform block and that of the reference function. It is for this reason that the transformation must be processed with successive data blocks overlapped by at least the size of the correlation reference function as shown in FIG. 5. In order to complete the processing in one pass, the block-pipelined FFT processor 12a must produce transformed blocks that are based on overlapped data in time-domain.

Figure 8:
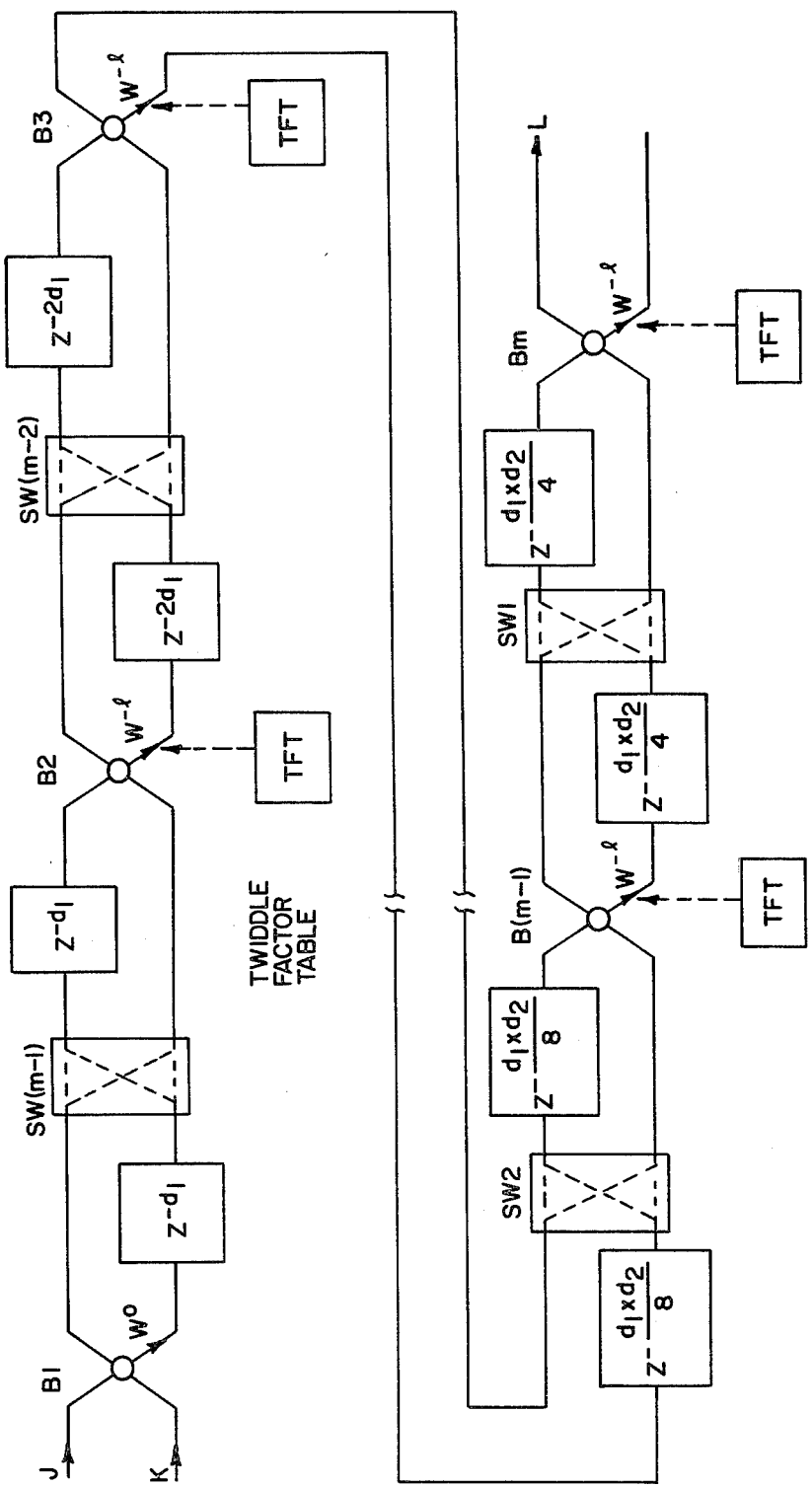
FIG. 8 is a functional block diagram of a block-pipelined inverse FFT for the azimuth correlator of FIG. 1.

The block-pipelined inverse FFT processor 12c is operated in inversed manner of the forward transform processor 12a. It has dual inputs corresponding to the dual outputs of the forward FFT. The two output ports of the last stage of the block-pipelined inverse FFT processor 12c shown in FIG. 8 are data in the time domain. Only one output, delayed by one-half of the transform block size with respect to the other output, is used. A connection is made at the input of the magnitude generator (squarer 12d), as shown in FIG. 5, to accept one-half of each data block at the output of the final two ports to produce valid azimuth correlator output in a continuous fashion. Of course, the correlation reference dimension must be less than half of the transform block size.

Note that since the correlator both accepts and outputs data in the form of sequential range samples, the internal block processing operation for the transform operation in the correlator is entirely transparent to the imaging operation. This is extremely desirable to facilitate the line-scan recording to produce a continuous long strip of image. The magnitude generator following the inverse transform processor is provided to produce image data for visual display.

From the foregoing, it is evident that the azimuth correlator is comprised of a block-pipelined FFT followed by two transversal filters for range migration corrections, two azimuth reference multipliers and a block-pipelined inverse FFT. Two transversal filters and two azimuth reference multipliers are required because the block-pipelined FFT processor has two outputs, output$_1$ (H) and output$_2$ (I) as shown in FIG. 6, each of which must be processed separately through a transversal filter. Consequently, the structure of the transversal filter shown in FIG. 7 for the output H is repeated for the output I. Both outputs J and K of these two structures are inputs to the block-pipelined inverse FFT as shown in FIG. 8. The magnitude of the inverse FFT output is then computed to produce SAR imaging data.

Major issues in assessing the flexibility of a SAR correlator include the change of the reference function width (the synthetic aperture width) and number of looks. As mentioned above, the size of the range and azimuth reference function cannot be greater than one-half of the transformation block due to the 50% overlapping in the transform processor. When a processor is designed to handle the largest possible synthetic aperture width, it naturally accommodates any shorter synthetic aperture length without requiring reprogramming of the correlator. The throughput is either in real-time rate or in the rate allowed by the limit of the internal clock speed of the processor.

Using the radix-2 pipelined FFT design, the processor can accommodate $2^l$ looks of SAR processing where l is a non-negative integer. The multiple look processing is accomplished by a subdivision of the azimuth spectra. Each look is produced from a segment corresponding to a $2^{-l}$ part of the azimuth spectrum. After the azimuth spectra are multiplied by the corresponding filter coefficients, the products are fed into the inverse block FFT processor, bypassing the first l stages of the radiax-2 FFT operators consisting of both of the butterfly unit and the delay memory for that stage. It should be kept in mind that as a characteristic of the FFT operation, adjacent Fourier coefficients of a $2^{-l}$ part of the spectral are output in a sequence separated by $2l-1$ data intervals. With the first l stages bypassed, the inverse transform size becomes $2^{m-l}$, where $2^m = M$ is the original transform block. The switching period for the data selector following the last stage must be reduced accordingly to maintain a continuous flow of valid output points. Also, overlay delay memory is needed to produce a multiple look image.

Modular expansion of the FFT processor to accommodate a longer synthetic aperture length is straightforward due to the inherent modularity of the pipelined FFT processor architecture.

The operation of the pipelined processor can be synchronized by one clock timing signal source. This facilitates the use as a real-time SAR processor, because the processor clock frequency can be a multiple of the radar pulse-repetition-frequency which often varies according to the sensor flight conditions.

SAR processing to produce 25 m resolution, 4-look SEASAT SAR images requires a synthetic aperture length of approximately 1024 radar transmitted pulses or echo lines per look. At an optimized sampling frequency, the number of range samples over the 100 km swath width is approximately four thousand. The transform block size of the azimuth correlator is set to be 2048. The forward block FFT processor requires a memory of approximately 4 K $\times 1.5 \times 2048 = 12$ Mega words, and the inverse block FFT processor requires 4 K$\times$2 K=8 Mega words. Assuming 32 bits are used in each complex work the total memory required is approximately 20 Mega, 32-bit words. The inverse block FFT processor performs, a four, 512-element transformation for the four look processing using the scheme described in the previous section. A data throughout rate of 10 MHz is required to produce images at a real-time rate.

The vast amount of memory required represents one major driving factor for the cost of implementing such a design. Another major bottleneck of implementation is the lack of the state-of-the art serial memory of large capacity for azimuth correlation. To remedy this, one can use the parallel implementation of multiple block FFT processors. Each processor accommodates a part of the swath width. This subswath partitioning may also be required to reduce the average data rate so that conventionally available random access memories (RAM's) and multipliers can readily be used.

Two transversal filters are needed, as noted hereinbefore, one for each output H and I of the block-pipelined FFT. The block diagram of the transversal filter is shown in FIG. 7. To correct for range migration, a coarse delay is provided by a programmable shift register 30 under control of the control processor at the input of the transversal filter for range migration compensation. This coarse delay provides the alignment of the first target response along each line. Subsequent data samples along each line are delayed by the same amount. The coarse delay is changed on a line-to-line basis. The target response of the same range distance will automatically be lined up along the azimuth direction by the coarse delay.

Figure 9:
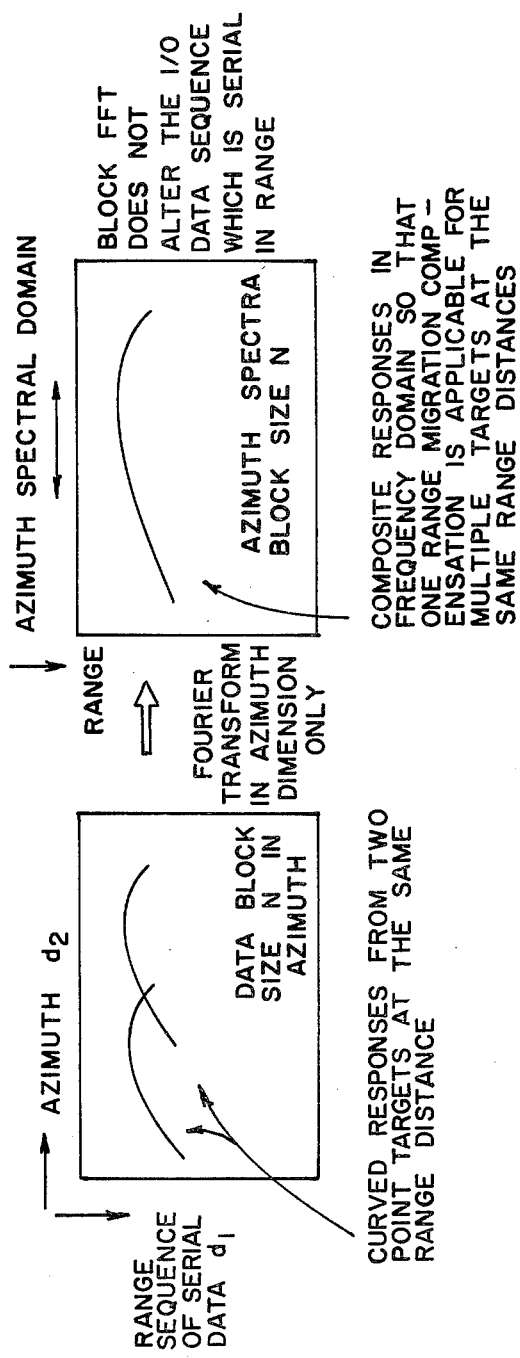
FIG. 9 is a diagram useful in understanding the corner-turn operation of the azimuth correlator.

It should be noted that the timing of the digital sampling pulses is such that they form a rectangular grid in the two-dimensional range and azimuth plane. However, the range delay history of a point target is a two-dimensional curve as shown in FIG. 9. Therefore, the discrete digital radar echo samples do not coincide with the loci of the maximum return from a point target. The use of a nearest-neighbor approximation on the curved target delay history will cause a loss in the pixel signal-to-noise ratio as well as a broadening of the target response to occur. Hence range interpolation to introduce points nearer to the target return curves is desired for achieving a better performance.

The range interpolation is achieved by a weighted sum of four range migration corrected samples as shown in FIG. 7, i.e., the output x(t) of the adder 40 is given by:

$$x(t) = \sum_{i=1}^{4} W_i x_i(nT) \tag{10}$$

where $X_i(nT)$ are the outputs of a tapped delay line comprised of shift registers 31–34 and $W_i$ are fixed interpolation weights of the form:

$$W_i = \frac{\sin\left(\frac{\pi}{T}\right)(t - iT)}{\left(\frac{\pi}{T}\right)(t - iT)} \tag{11}$$

In the above equations T is the digital sampling time, and the multiplications are carried out in multipliers 35–38. The sum is then formed in an adder 40. The output of the interpolation filter is resampled and fed into an azimuth reference multiplier 42. The purpose of the azimuth reference multiplier shown in FIG. 7 is to provide necessary phase compensation.

The block diagram of a $d_2$-point DIF block-pipelined inverse FFT with corner-turn memory for a $d_1 \times d_2$ data block, where $d_2 = 2^m$, is shown in FIG. 6. The inverse FFT is similar to the forward FFT described above, except here different delays are used among the FFT stages, and only one output of the last FFT stage is used due to the fact that the overlap-and-save scheme produces $\frac{1}{2}$ block of bad data. Thus, the output of the inverse FFT is sequential line-by-line along the range direction. This output is fed into the squarer 12d (FIG. 1) which provides an output to an imaging device and to the range migration and azimuth reference function generator 14b for autofocusing and clutterlock adjustments.

Figure 11:
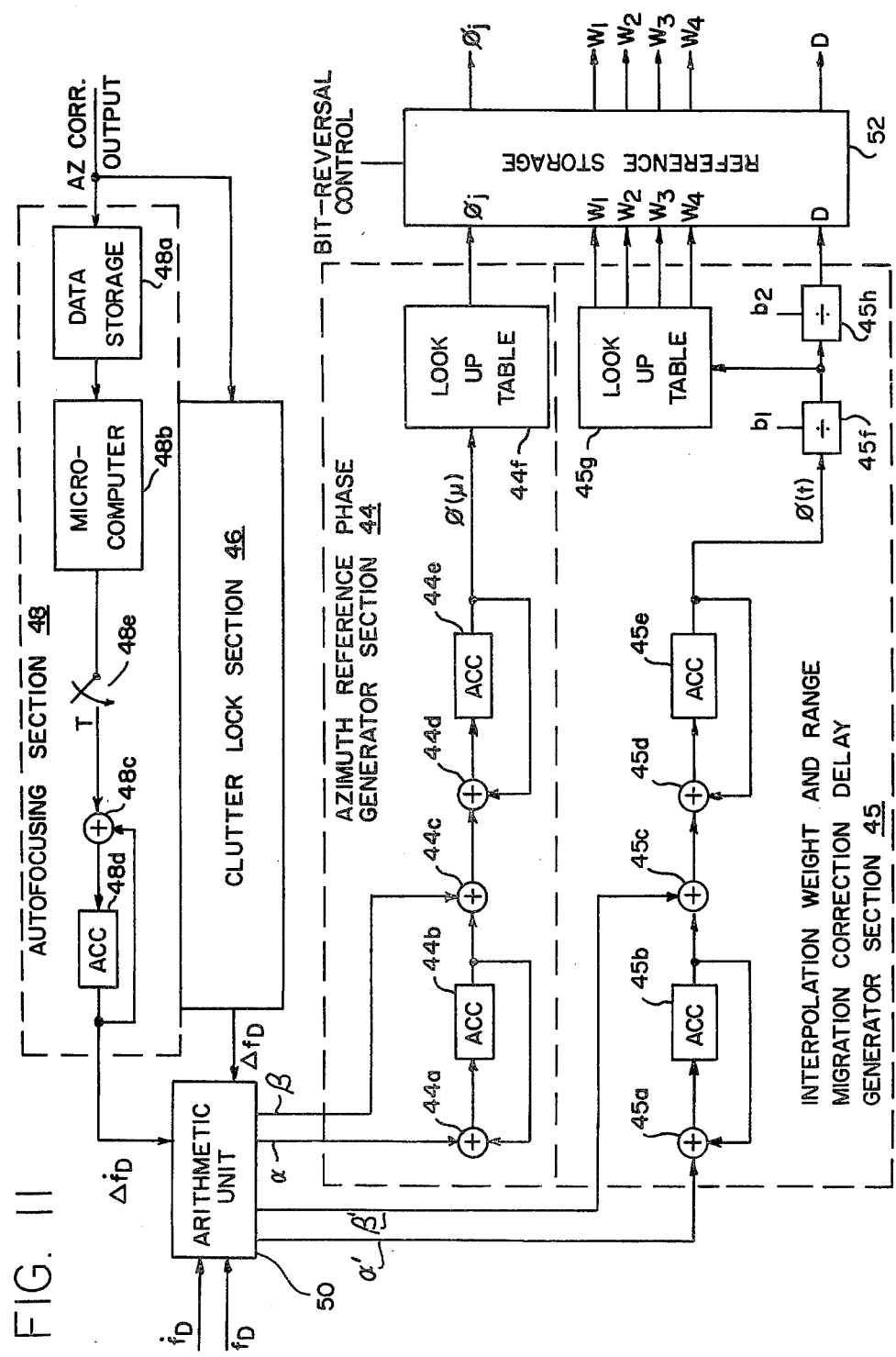
FIG. 11 is a block diagram illustrating the organization of a range migration compensation function and azimuth reference function generator in the system shown in FIG. 1.

The organization of the generator 14b (FIG. 1) for the range migration compensation and azimuth reference functions will now be described with reference to FIG. 11. While reference will be made to discrete functional blocks which may be implemented with hardware, it should be understood that in practice the functions indicated by the blocks are carried out by a programmed control processor.

The generator 14b accepts the estimates of Doppler center frequency $f_D$ and frequency rate $\dot{f}_D$ from an outside source, either a control microcomputer or an operator keyboard, and generates a set of initial azimuth references. The initial references are used in azimuth correlation, and the output of the azimuth correlator is fed back to the azimuth reference function generator for adjustments in the $f_D$ and $\dot{f}_D$ estimates. A new set of reference functions is generated, and the feedback continues. The generator is therefore comprised of an azimuth reference phase generator section 44 for generating range migration and azimuth reference functions (coefficients), and an interpolation weights and range migration correction delay generator section 45, both sections operating on the best estimates of $f_D$ and $\dot{f}_D$, which are continually revised by a clutterlock section 46 and an autofocusing section 48. The clutterlock section provides an error signal $\Delta f_D$ to refine the estimate of Doppler frequency $f_D$ based on the single-look image data from the azimuth correlator 12 (FIG. 1). The autofocusing section provides an error signal $\Delta \dot{f}_D$ to refine the estimate of Doppler frequency shift rate $\dot{f}_D$ based on the single-look image data. The functional operations of these three sections will now be described in order.

Section 44 generates the azimuth phase $\phi$ over the SAR aperture duration. That phase follows a quadratic function of the elapsed time along track, t, and is given by the following equation:

$$\phi(t) = f_D t + \tfrac{1}{2}\dot{f}_D t^2 \tag{12}$$

A Fourier transform of the complex phase function $e^{j\phi(t)}$ results in the following form:

$$H(u) = F(e^{j\phi(t)}) \simeq A e^{-j\frac{(u+f_D)^2}{2\dot{f}_D}} \tag{13}$$

where A is a constant. The increment of u in equally spaced frequency domain is a constant. Therefore, an array of the phase values of H(u) for a fixed increment in u can be generated by a double integrator comprised of elements 44a, b, c, d and e. More explicitly, the phase of H(u) is $$\phi(u) = \phi_o + \frac{f_D}{\dot{f}_D} u + \frac{1}{2\dot{f}_D} u^2 \tag{14}$$

The $\alpha$ and $\beta$ inputs to the summing circuits 44a to 44c are quantities derived by an arithmetic unit 50 from its inputs as follows:

$$\alpha = k_1 \frac{1}{\dot{f}_D + C_1 \Delta \dot{f}_D} \tag{15}$$

$$\beta = k_1 \frac{f_D + C_2 \Delta f_D}{2(\dot{f}_D + C_1 \Delta \dot{f}_D)} \tag{16}$$

where $k_1$ is a constant determined by the radar pulse repetition frequency, $C_1$ and $C_2$ are constants adjustable to obtain the best feedback loop performance. The $\alpha$ input is integrated by the accumulator 44b and the summing circuit 44a. The sum of $\beta$ and integrated $\alpha$ is further integrated by a summing circuit 44d and accumulator 44e to produce the value of $\phi(u)$. This value is used in a lookup table to determine the complex azimuth reference coefficients applied to the multipliers in the transversal filter 12b of the azimuth correlator as shown in FIG. 7.

A similar operation is carried out by elements 45a, b, c, d and e to obtain a value $\phi(t)$ along track with inputs $\alpha'$ and $\beta'$ computed in the arithmetic unit from its inputs as follows:

$$\alpha' = k_2(\dot{f}_D + C_1 \Delta \dot{f}_D) \tag{17}$$

$$\beta' = k_2(f_D + C_2 \Delta f_D) \tag{18}$$

where $k_2$ is a constant determined by the radar frequency pulse repetition rate. The phase $\phi(t)$ is divided by a first constant $b_1$ in a divider 45f to obtain a value of range migration on the order of meters. This range migration value is used in a lookup table 45g to determine the interpolation weights $W_1$, $W_2$, $W_3$ and $W_4$ applied to the transversal filter as shown in FIG. 7. The range migration value out of the divider 45f is also applied to another divider 45h where it is divided by another constant $b_2$ to produce a delay value D applied to the programmable shift register 30 in the transversal filter shown in FIG. 7. The constants $b_1$ and $b_2$ are scaling constants for the range interpolation and sample positions determined from the radar transmitter and range sampling frequencies, which are generally related by an integer multiplier.

The clutterlock section 46 computes the mean image energy $E_1$, $E_2$, $E_3$ and $E_4$ of four looks over the same target area and then obtains the error signal, $\Delta f_D$, according to the equation:

$$\Delta F_D = (E_1 + E_2 - E_3 - E_4) \tag{19}$$

Each of the values $E_i$, are produced by integrating successive single looks. The $E_i$ values all correspond to the same target area. Therefore the measurement used as the error signal $\Delta f_D$ is independent of any target scene variation. An architecture for computing this measurement is disclosed in FIG. 8 of a copending application Ser. No. 969,761 filed by Chialin Wu and Vance C. Tyree on Dec. 12, 1978. This error signal $\Delta f_D$ is integrated and added to the Doppler frequency estimate $f_D$ by the arithmetic unit.

The autofocusing section 48 computes the crosscorrelation of the first and last look images which correspond to the leading and trailing edge of the synthetic aperture. Consequently, a running succession of looks are stored in a data storage unit 48a for correlation of each one entered with the corresponding last or trailing edge look. Assuming the ith pixel in azimuth of the first look is denoted as $P_{li}$, and the corresponding pixel of the last (4th) look to be overlaid to $P_{li}$ is $P_{4i}$ (assuming 4 looks total), the crosscorrelation derived error signal is given by the following equation $$\Delta \dot{f}_D = \overline{(P_{1,i} \times P_{4,i-1}} + \overline{P_{1,i} \times P_{4,i-2})} \\ -(\overline{P_{1,i} \times P_{4,i+1}} + \overline{P_{1,i} \times P_{4,i+2}}) \tag{20}$$

where the bar over the products refers to the mean of the quantity below. This error signal $\Delta \dot{f}_D$ is integrated by a summing circuit 48c and accumulator 48d.

It should be noted that the error signal $\Delta \dot{f}_D$ is updated periodically through a switch 48e, i.e., the error signal is computed for a period T and then applied to the summing circuit and accumulator at the end of each period by effectively closing the switch momentarily. The integrated error signal from the accumulator 48d is applied continuously to the arithmetic unit. The clutterlock section 46 is similarly controlled by the same timing T. The arithmetic unit continuously applies these error signals $\Delta f_D$ and $\Delta \dot{f}_D$ to arrive at the final parameters A, B, C and D as described above. The $\phi(u)$ values are used to look up complex azimuth reference coefficients for correlation, and the value $\phi(t)$ divided by $b_1$, and then divided again by $b_2$, is used for the respective purposes of looking up interpolation weights and delay coefficients.

All of these quantities are first stored in a reference storage unit 50 and are read out according to an FFT bit - reversal sequence required to supply the transversal filter with the appropriate coefficients according to the flow diagram of FIG. 10. Note that the 8 points (each of which is a line of $d_1$ samples along the range direction for this exemplary $d_1 \times 8$ data block are numbered in sequence on the left from 0 through 7, but after processing through the block-pipelined FFT, the order is not sequential, but rather as shown on the right. However, upon observing the binary numbers in parenthesis for the points 0–7 with the binary numbers of the output samples directly across, it is seen that by simply reversing the order of the bits for the input sample numbers, the proper binary number for the output samples is generated. For example, the output number for the input sample number 4 is 1 generated by reversing the sequence of the binary digits 100 to 001.

Although particular embodiments of the invention have been described and illustrated herein, it is recognized that modifications and variations may readily occur to those skilled in the art. Consequently, it is intended that the claims be interpreted to cover such modifications and equivalents.

What is claimed is:

1. In a synthetic aperture radar system (SAR) having means for correlating range sampled data with a range reference function to produce the SAR response of range correlated data in sequential form, range line by range line in the time domain, a method for correlating said SAR response in the azimuth direction utilizing a block-pipelined Fast Fourier Transform (FFT) operation with a predetermined FFT transform size comprised of the step of delaying said SAR response to embed in the Fourier transform operation a corner-turning function as said SAR response is converted from the time domain to a frequency domain, providing predetermined delays for said SAR response for accurate range migration compensation and multiplying said SAR response in the frequency domain with an azimuth reference function in the azimuth frequency domain.

2. A method as defined in claim 1 further including an inverse FFT operation to restore azimuth correlated data in the frequency domain to the time domain for imaging.

3. A method as defined in claim 2 including the step of generating said azimuth reference function from estimates of Doppler center frequency, $f_D$, and frequency rate, $\dot{f}_D$, and including the step of continually feeding back single-look output data from said inverse FFT for adjustments in $f_D$ and $\dot{f}_D$ estimates, whereby clutterlock and autofocusing is provided.

4. A method as defined in claim 3 including the step of storing said azimuth reference function to be applied to sequential azimuth data points, where each point is a line of range samples, and reading out said azimuth reference function in a different order required to supply said transversal filter with reference coefficients in appropriate order for block-pipelined FFT operation.

5. A method as defined in claim 4 wherein said azimuth data points are in binary numbered sequence, and said different order for reading out said reference coefficients is established by reversing the sequence of binary digits for each number of data points in sequence and reading out the reference function stored for the binary number corresponding to the reverse binary digit for each number of data points in sequence.

6. A method as defined in claim 5 including the step of generating for said transversal filter a range migration compensation function, D, and interpolation weights, $W_i$, as a function of said frequency, $f_D$, and frequency rate, $\dot{f}_D$, for delaying data into said transversal filter, and said interpolation weights being applied to i data points combined into a single output data point, where each data point is a line of range samples.

7. A method as defined in claim 6 including the step of storing said delay function D and interpolation weights $W_i$ to be applied to sequential azimuth data points, where each point is a line of range samples, and the further step of reading out said azimuth reference function in a different order required to supply said transversal filter with said delay function D and interpolation weights $W_i$ in the same bit-reversed sequence as said reference coefficients.

8. In a synthetic aperture radar system (SAR) having means for correlating range sampled data with a range reference function to produce the SAR response of range correlated data in sequential form, range line by range line in the time domain, apparatus for correlating said SAR response in the azimuth direction utilizing a block-pipelined Fast Fourier Transform (FFT) having a predetermined FFT transform size comprised of means for delaying said SAR response to embed in the Fourier transform operation a corner-turning function as said SAR response is converted from the time domain to a frequency domain, and including a transversal filter connected to receive said SAR response in the frequency domain, said transversal filter having means for accurate range migration compensation and means for multiplying said SAR response in the frequency domain with an azimuth reference function in the azimuth frequency domain.

9. Apparatus as defined in claim 8 further including a block-pipelined inverse FFT to restore azimuth correlated data in the frequency domain to the time domain for imaging.

10. Apparatus as defined in claim 9 including means for generating said azimuth reference function from estimates of Doppler center frequency, $f_D$, and frequency rate, $\dot{f}_D$, and including means for continually feeding back single-look output data from said inverse FFT to said generating means for adjustments in $f_D$ and $\dot{f}_D$ estimates, whereby clutterlock and autofocusing is provided.

11. Apparatus as defined in claim 10 including means for storing said azimuth reference function to be applied to sequential azimuth data points, where each point is a line of range samples, and means for reading out said azimuth reference function in a different order required to supply said transversal filter with reference coefficients in appropriate order for block-pipelined FFT operation.

12. Apparatus as defined in claim 11 wherein said azimuth data points are in binary numbered sequence, and said different order for reading out said reference coefficients is established by means for reversing the sequence of binary digits for each number of data points in sequence and means for reading out the reference function stored for the binary number corresponding to the reverse binary digit for each number of data points in sequence.

13. Apparatus as defined in claim 12 including means for generating a range migration compensation function, D, as a function of said frequency, $f_D$, and frequency rate, $\dot{f}_D$, and interpolation weights, $W_i$, for said transverse filter, means responsive to said function D for delaying data into said transversal filter, means for applying said interpolation weights to i data points combined into a single data point, where each data point is a line of range samples.

14. Apparatus as defined in claim 13 including means for storing said delay function D and interpolation weights $W_i$ to be applied to sequential azimuth data points, where each point is a line of range samples, and means for reading out said azimuth reference function in a different order required to supply said transversal filter with said delay function D and interpolation weights $W_i$ in the same bit-reversed sequence as said reference coefficients.

* * * * *